Figure 1:
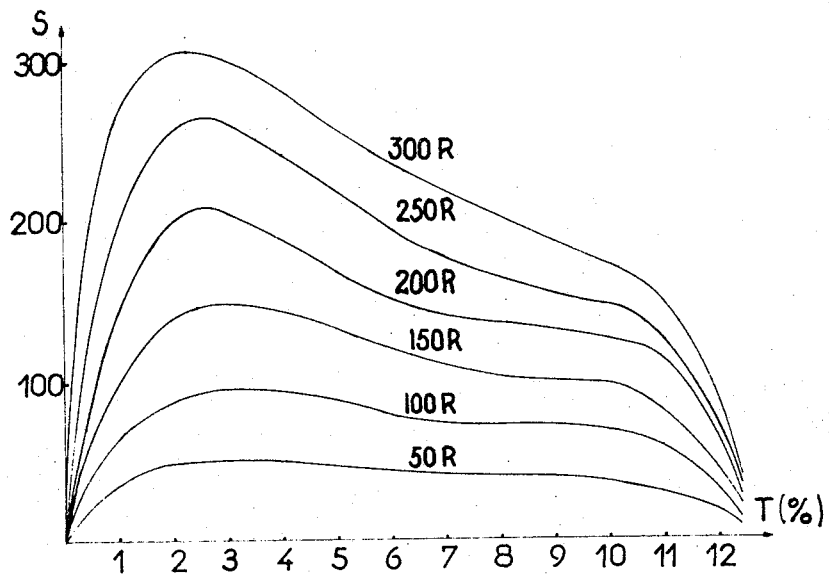

Dec. 27, 1966  R. BEDIER ET AL  3,294,700

PHOSPHATE GLASS FOR THE DOSIMETRY OF X- AND GAMMA-RAYS

Filed March 22, 1963

3,294,700
PHOSPHATE GLASS FOR THE DOSIMETRY
OF X- AND GAMMA-RAYS
Renée Bedier, Paris, Serge Carpentier, Creteil, Henri Francois, Paris, Anne-Marie Grand-Clement, Orsay, and Jean Meneret, Sevres, France, assignors to Commissariat a l'Energie Atomique, Paris, France
Filed Mar. 22, 1963, Ser. No. 267,125
Claims priority, application France, Mar. 23, 1962, 892,126, Patent 1,327,099; Mar. 1, 1963, 926,582
1 Claim. (Cl. 252—301.4)

The present invention, relates to a new glass for the dosimetry of X- and gamma-rays, the essential constituents of this glass being phosphates and the activating agent silver.

It is known that irradiation by X- or gamma-rays of glasses sensitized with silver brings about a latent change therein. Subsequent exposure of such irradiated glasses to a beam of ultra-violet light induces a fluoroescence, the intensity of which is proportional to the dosage of penetrating radiation previously received.

Several glasses of this type have already been produced. Certain among these, for example, are made from starting compositions having as principle constituents the metaphosphates of aluminium, potassium and barium, to which is added silver metaphosphate as activator. These glasses have a relatively satisfactory sensitivity over a considerable range of energy of penetrating radiation (X or gamma). Unfortunately their intensity of fluorescence is not constant, with constant dose of exciting radiation, when the energy of the radiation used varies. This characteristic is particularly evident at relatively low energies, where this intensity of fluorescence increases in a notable manner.

It is known to modify the fluoresence response, as a function of the energy, by enclosing the dosimetric glass partially or totally in a metallic screen of appropriate thickness.

It is also known to reduce the fluorescence response of glasses for the low energies by the use of metaphosphates of metals of low atomic number. Bausch and Lomb have recommended the use of glasses made from a mixture of metaphosphates of lithium, magnesium, aluminium and silver. Such glasses can be used without shielding and their sensitivity to fluorescence is much more regular, however, this sensitivity is somewhat reduced for high energies.

All the known glasses made from metaphosphate compositions share certain disadvantages. The fluorescence of these glasses cannot be measured rapidly after irradiation and a stabilizing period of considerable lengths (of the order of about 16 hours) must elapse before useful measurements can be obtained. Furthermore, it is impossible to use these glasses to measure low intensities of radiation below 10 roentgens.

The object of the present invention is to provide a glass not subject to the disadvantages described.

A Phosphate glass according to the invention including silver oxide as activator and suitable for use in the dosimetry of X- and gamma-rays is made from a composition comprising the methaphosphates of lithium, beryllium, sodium, aluminium and silver. The glass is made by fusion of such a mixture in the customary manner. According to a preferred embodiment, the percentage proportions by weight of the oxides of lithium, beryllium, sodium, aluminium and phosphoric anhydride ($P_2O_5$) in the glass thus formed are within the following limits:

TABLE I

| | |
|---|---|
| $Li_2O$ | 1.5–7.7 |
| $BeO$ | 1.3–6.6 |
| $Na_2O$ | 0–7.6 |
| $Al_2O_3$ | 0.9–8.5 |
| $P_2O_5$ | 71.8–80.5 |

The sensitivity of gamma-rays of such a glass varies to a considerable extent according to the silver oxide content, especially when the glass is subjected to radiation of 100 to 300 roentgens.

Reference will be made hereinafter to the accompanying drawing, the figures of which shown graphically certain properties of glasses according to the invention.

FIGURE 1 shows the variations in the relative sensitivity S of such a disometric glass as a function of the percentage content T of silver oxide, the other constituents of the glass and their proportions being within the ranges given in Table I irrespective of the silver oxide content. The different curves of FIG. 1 correspond to different doses of radiation, from 50 to 300 roentgens.

It is evident that all the curves have a maximum sensitivity corresponding to a silver oxide content between 2.1% and 3.3%. Reduction of this content from its optimal value produces a considerable reduction in sensitivity which is especially large when the silver content is reduced below 1.5%, and increasing the content also causes a reduction in sensitivity which falls off sharply when the content reaches a value of 10% to 12%.

Consequently it is preferred that the glass according to the invention, the composition of which in terms of the oxides of lithium, beryllium, sodium and aluminium and phosphorus is given in Table I, should include 1.5 to 9.3 parts by weight of silver oxide, $Ag_2O$.

The glasses having the composition according to the invention have a regular fluorescence response. They can usefully be subjected to measures of fluorescence after a short delay of the order of a quarter to half an hour after irradiation. These glasses can be used to measure with good precision small amounts of radiation. The glasses can be used to make dosimeters for use in atomic installations, especially for the supervision of personnel exposed to nuclear radiation, for the control of atomic piles and radiation sources as well as for civil defense protection and so forth. Such dosimeters also have biological and medical applications.

It has been found furthermore that after such glasses have been exposed to various gamma-ray doses and have been stored for periods of over a year, no reduction occurs in the fluorescence intensity induced by ultraviolet light. Dosimeters containing these glasses can thus serve as integrators.

When a glass according to the invention is heated at a temperature below ($\theta$–50° C.), $\theta$ being the softening temperature, it maintains a remarkable stability in its dosimetric properties, but if this temperature reaches or exceeds the value ($\theta$–50° C.), up to the softening point, its dosimetric capacity, i.e., its fluorescence after exposure to ultra-violet light, disappears.

The glasses of the invention also have a very high resistance to chemical agents and are practically unhydrolysable.

By way of non-limitative example, there are given in the following table the compositions by weight of three starting mixtures for the production of glasses according to the invention:

TABLE II

|  | Example No. | | |
|---|---|---|---|
|  | I | II | III |
|  | (parts by weight) | | |
| lithium metaphosphate | 21 | 18 | 19 |
| beryllium metaphosphate | 21 | 18 | 19 |
| sodium metaphosphate | 23 | 18 | 21 |
| aluminum metaphosphate | 35 | 46 | 41 |
| silver metaphosphate | 10 | 7 | 15 |

Study of these glasses has produced evidence of its exceptional qualities. Consequently, the use of these glasses allows extremely sensitive dosimetry to be obtained with a fluorescence response more regular than that of previously known glasses.

Figures 2, 3:
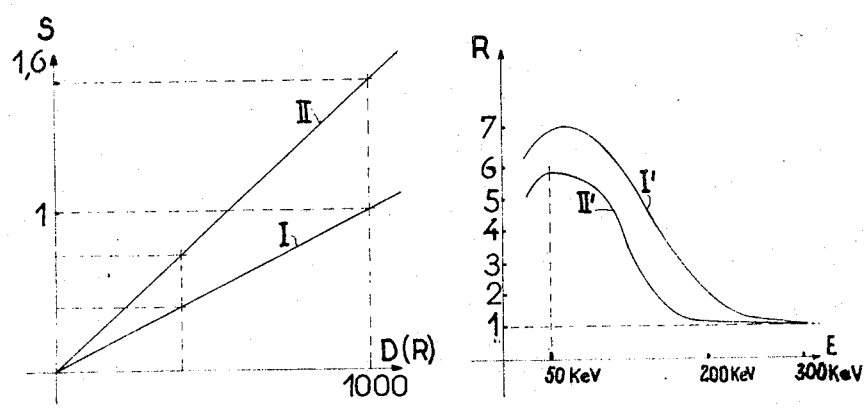

The curves of FIG. 2 show the variation in the sensitivity S of the dosimetric glass as a function of the irradiating dose D, measured in roentgens, from a source of 60 Co. The curve I corresponds to a metaphosphate glass made according to Bausch and Lomb, which is dealt with above while curve II corresponds to a glass according to the present invention, the composition of which has been described above. It is evident that the slope of curve II is considerably greater than that of curve I, the sensitivity of the glass of the invention being the better.

The graph of FIG. 3 also comprises two curves I′ and II′ which show, for the glass according to Bausch and Lomb (I′) and for the glass according to the invention (II′), at constant doses of radiation D, the variation of the ratio R between the intensity of fluorescence after irradiation by a source of energy E and the intensity of fluorescence after irradiation by a source at 60 Co. as a function of this energy E.

It is evident that the hypersensitivity of the glass made according to Bausch and Lomb at low energy is notably greater than the hypersensitivity of the glass according to the invention.

Further, while the glass producing curve I gives responses equal to unity, that is responses equivalent to irradiation by 60 Co for an energy of 300 kev., the glass producing curve II has an equivalency of abaut 200 kev.

We claim:

A phosphate glass suitable for use in the dosimetry of X- and gamma-rays consisting essentially of silver oxide as activator and the metaphosphates of lithium, beryllium, sodium, aluminum and silver having the percentage compositions by weight within the following limits:

|  | Percent |
|---|---|
| $Li_2O$ | 1.5–7.7 |
| $BeO$ | 1.3–6.6 |
| $Na_2O$ | 0–7.6 |
| $Al_2O_3$ | 0.9–8.5 |
| $Ag_2O$ | 1.5–9.3 |
| $P_2O_5$ | 71.8–80.5 |

References Cited by the Examiner

UNITED STATES PATENTS

| 2,270,124 | 1/1942 | Huniger et al. | 252—301.4 |
| 2,999,819 | 9/1961 | Blair | 252—301.4 |
| 3,020,238 | 2/1962 | Munakata et al. | 252—408 |

HELEN M. McCARTHY, *Acting Primary Examiner.*

MAURICE A. BRINDISI, TOBIAS E. LEVOW,

*Examiners.*

R. D. EDMONDS, *Assistant Examiner.*